F. KARSITZ.
BUTTONHOLE SCISSORS.
APPLICATION FILED JAN. 23, 1913.

1,077,280.

Patented Nov. 4, 1913.

Witnesses
J. M. Lyles
R. W. Fishburne

Inventor
Frank Karsitz,
By C. L. Parker
Attorney

UNITED STATES PATENT OFFICE.

FRANK KARSITZ, OF BRIDGEPORT, CONNECTICUT.

BUTTONHOLE-SCISSORS.

1,077,280.   Specification of Letters Patent.   Patented Nov. 4, 1913.

Application filed January 23, 1913. Serial No. 743,817.

*To all whom it may concern:*

Be it known that I, FRANK KARSITZ, a citizen of the United States, residing at Bridgeport, in the county of Fairfield and State of Connecticut, have invented certain new and useful Improvements in Buttonhole-Scissors, of which the following is a specification.

My invention relates to button-hole scissors having an adjusting nut disposed between the shanks thereof to restrict or limit the cutting movement of the blades, so that an accurate adjustment may be obtained for cutting just the desired length of buttonhole, and yielding means to hold the adjusting nut in engagement with one of the shanks so that the same may not be accidentally rotated whereby the adjustment would be lost.

An important object of this invention is to provide a button-hole scissors of the above mentioned character, which is simple in construction, durable and cheap to manufacture.

Other objects and advantages of the invention will be apparent during the course of the following description.

Figure 1:
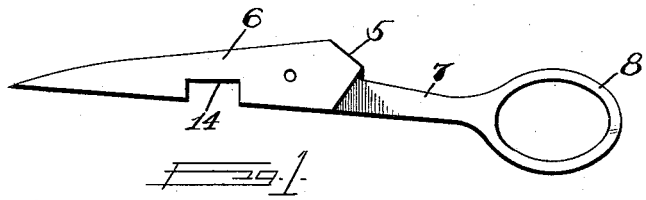
Figure 2:
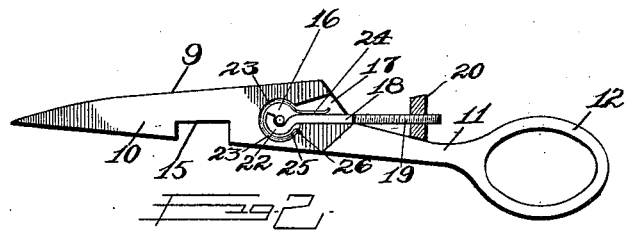
Figure 3:
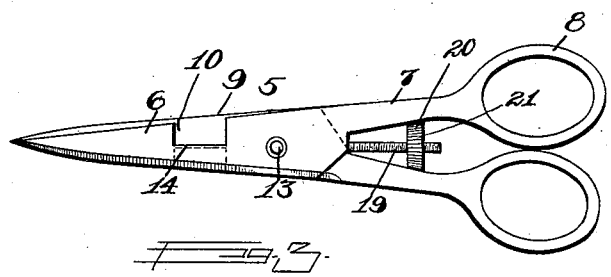
Figure 4:
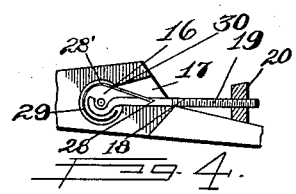

In the accompanying drawings forming a part of this specification and in which like numerals are employed to designate like parts throughout the same, Figure 1 is an inner plan view of one of the cutting members, Fig. 2 is a similar view of the other coacting cutting member, Fig. 3 is a plan view of the scissors, the parts thereof being assembled, and, Fig. 4 is a side view of a slightly different form of adjusting means.

In the drawings, wherein is illustrated a preferred embodiment of my invention, the numeral 5 designates a cutting member, comprising a blade 6, shank 7 and loop-handle 8. Coöperating with the cutting member 5 is a second cutting member 9, comprising a blade 10, a shank 11 and a loop-handle 12. These cutting members are assembled in the usual manner and are pivotally connected by a pin or screw 13, as shown. The blades 6 and 10 are provided upon their cutting edges with openings 14 and 15, as is customary. The blade 10 is provided with an enlarged recess or opening 16, which surrounds the pin or screw 13. The opening 16 has communication with a tapered opening 17, extending longitudinally through the rear portion of the blade, as shown.

The numeral 18 designates a rod or shaft, having its rear or free end portion screw-threaded, as shown at 19, for receiving an adjusting nut or element 20. The adjusting nut has its periphery milled or roughened as shown at 21. The forward end of the rod or shaft 18 is bent to form a hookhead 22, which is disposed within the opening 16 and partly surrounds the pin 13, the smooth portion of the rod or shaft 18 operating within the tapered longitudinal recess 17, as shown.

In button-hole scissors as heretofore constructed, which employ an adjusting nut disposed between the shanks of the cutting members, great difficulty has been experienced due to the fact that the adjusting nut is capable of being accidentally rotated, whereby the proper adjustment of the scissors is lost. As far as I am aware, no reliable and simple means have been devised for preventing this accidental rotation of the adjusting nut. To overcome this disadvantage, I provide a leaf spring including a curved portion 23 which fits within the opening 16 and a rearwardly extending arm or portion 24, which engages the rod or shaft 18, as shown. I have found that ordinarily the curved portion 22 will have sufficient frictional engagement with the wall of the opening 16, whereby this curved portion will not slip when the rod or shaft 18 is swung away from the shank 11, the arm 24 being adapted to have proper slidable engagement with the rod or shaft 18. I prefer however to bend the free end of the curved portion 23 outwardly, for forming a radial extension 25, fitting within an opening 26, whereby this curved portion is positively prevented from slipping. It is thus seen that the spring will normally yieldingly hold the adjusting nut 20 in engagement with the shank 11, whereby the accidental rotation of the adjusting nut is prevented, during the cutting operation of the scissors.

In Fig. 4, I have shown a slightly different form of adjusting means. In this form of my invention the parts of the scissors remain the same, except that the rod or shaft 18 has a slot or opening 28 formed therein, to receive one end of a leaf spring 28', which is clamped between the walls of the slot or opening. Any other suitable means may be employed to attach the end of the leaf spring to the rod or shaft. The leaf spring 28' includes a curved portion 29, to fit within the opening 16, the outer portion or arm of the leaf spring engaging a shoulder 30. In this construction the curved portion 29 of the leaf spring is free to slightly turn within the recess 16, the spring action being attained by the outer portion of the spring engaging and swinging upon the shoulder 30 as a pivot.

It is to be understood that the forms of my invention herewith shown and described, are to be taken as preferred examples of the same, and that certain changes in the shape, size and arrangement of parts may be resorted to without departing from the spirit of the invention or the scope of the subjoined claims.

Having fully described my invention, I claim:—

1. Button-hole scissors of the character described, comprising pivoted cutting members including shanks, a rod pivotally connected with the cutting members and disposed between the shanks, an adjusting nut having screw-threaded engagement with the shank, and means to normally hold the adjusting nut in permanent yielding engagement with one of the shanks.

2. Button-hole scissors of the character described, comprising co-acting cutting members including shanks, one cutting member provided with a recess formed therein, pivoted means to connect the cutting member and passing through a portion of the recess, a rod disposed within the recess and having pivotal connection with the pivot means and extending outwardly of the recess between the shanks, an adjusting nut having screw-threaded engagement with the shank and adapted to engage with the same, and a spring disposed within the recess and engaging the shank to normally retain the same in one position with relation to one shank whereby the adjusting nut will be held in yielding engagement with such shank.

3. Button-hole scissors of the character described, comprising co-acting cutting members including shanks, a recess formed within one cutting member including a circular and longitudinally extending portion, a pin pivotally connecting the cutting members and extending through the circular portion of the recess, a rod extending with the longitudinal portion of the recess and having a curved head disposed within the circular portion of the recess in engagement with the pin, a leaf spring including a curved portion surrounding the curved head within the circular portion of the recess and carrying an outwardly extending arm disposed within the longitudinal portion of the recess in engagement with the rod, and an adjusting nut having screw-threaded engagement with the outer portion of the rod.

4. Button-hole scissors of the character described, comprising co-acting cutting members including shanks, means pivotally connecting the cutting members, a rod disposed between the shanks and pivotally connected with the cutting members, a spring attached to the rod and engaging a portion of one cutting member to urge the rod toward such cutting member, and an adjusting nut having screw-threaded engagement with the rod and adapted to engage the shanks.

5. Button-hole scissors of the character described, comprising pivoted cutting members including shanks, a rod pivotally connected with the cutting members and disposed between the shanks, an adjusting nut having screw-threaded engagement with the rod to limit the inward movements of the shanks, and means to prevent accidental rotation of the adjusting nut.

In testimony whereof I affix my signature in presence of two witnesses.

FRANK KARSITZ.

Witnesses:
SAMUEL MELLITZ,
MARCUS HIRSCH.